(12) United States Patent
Sales

(10) Patent No.: US 8,646,437 B2
(45) Date of Patent: Feb. 11, 2014

(54) COLD START UP AUXILIARY SYSTEM FOR ALCOHOL AND FLEX ENGINES WITH AIR-INLET AND ALCOHOL WARM UP

(75) Inventor: Luís Carlos Monteiro Sales, Belo Horizonte/MG (BR)

(73) Assignee: Fiat Automotives S/A—Filial Mecanica, Betim/MG (BR)

( * ) Notice: Subject to any disclaimer, the term of this patent is extended or adjusted under 35 U.S.C. 154(b) by 1429 days.

(21) Appl. No.: 12/088,075

(22) PCT Filed: Sep. 12, 2006

(86) PCT No.: PCT/BR2006/000189
§ 371 (c)(1),
(2), (4) Date: Jul. 17, 2008

(87) PCT Pub. No.: WO2007/030906
PCT Pub. Date: Mar. 22, 2007

(65) Prior Publication Data
US 2009/0241915 A1 Oct. 1, 2009

(30) Foreign Application Priority Data

Sep. 12, 2005 (BR) ..................................... 0504047
May 9, 2006 (BR) ................................. C1 0504047

(51) Int. Cl.
*B05B 1/24* (2006.01)
*F02M 51/00* (2006.01)
*F02G 5/00* (2006.01)

(52) U.S. Cl.
USPC ........... 123/549; 123/557; 123/478; 239/128; 239/134; 239/135

(58) Field of Classification Search
USPC ............ 123/455, 456, 179.16, 304, 391, 472, 123/478, 549, 543, 557, 575; 239/128, 132, 239/134, 135
See application file for complete search history.

(56) References Cited

U.S. PATENT DOCUMENTS

| 4,020,815 | A | * | 5/1977 | Hubert | .................... 123/142.5 R |
| 4,593,670 | A | * | 6/1986 | Nara et al. | .................... 123/545 |
| 4,938,180 | A | * | 7/1990 | King | ........................ 123/179.15 |
| 5,401,935 | A | * | 3/1995 | Smith et al. | .................... 219/206 |
| 5,529,035 | A | * | 6/1996 | Hunt et al. | ............... 123/179.15 |

(Continued)

FOREIGN PATENT DOCUMENTS

| DE | 102004007797 A1 | 9/2005 |
| EP | 1408232 A2 | 4/2004 |
| FR | 2876161 A | 4/2006 |
| WO | 2005024224 A | 3/2005 |

*Primary Examiner* — Thanh Truong
*Assistant Examiner* — Tea Holbrook
(74) *Attorney, Agent, or Firm* — Volpe and Koenig, P.C.

(57) ABSTRACT

The present invention relates to a new auxiliary system of cold start, preferably used in the internal combustion engines that use alcohol as fuel. The engines 'Flex Fuel' (alcohol/gasoline/GNV) are included in the possibility of the use of this invention. The cold starting system makes use of resistances (3) positioned in the entrance of the injectors (4); resistances (6) inside of each injector (1) or one resistance (5) for every pipe holder of nozzles (2), and the three possibilities can be used simultaneously, combined two by two or separately, depending on the necessity of warm up alcohol flow and the energy consumption. It can also make use of groups of resistances (11, 12, 13) positioned in the intake. Additionally one or two auxiliary injectors can be foreseen (supplementary) in the intake collector with the same alcohol heating system.

5 Claims, 15 Drawing Sheets

(56) References Cited

U.S. PATENT DOCUMENTS

| | | | |
|---|---|---|---|
| 5,894,832 A * | 4/1999 | Nogi et al. | 123/491 |
| H1820 H * | 12/1999 | Graves et al. | 123/557 |
| 6,176,226 B1 * | 1/2001 | Nines et al. | 123/549 |
| 6,354,256 B1 * | 3/2002 | Ohanian et al. | 123/179.21 |
| 6,769,411 B2 * | 8/2004 | Fabiani | 123/478 |
| 6,922,987 B2 * | 8/2005 | Mital et al. | 60/286 |
| 7,158,718 B2 * | 1/2007 | Russegger | 392/488 |
| 7,225,998 B2 * | 6/2007 | Pellizzari | 239/136 |
| 7,337,768 B2 * | 3/2008 | Elia et al. | 123/549 |
| 7,357,124 B2 * | 4/2008 | Elia et al. | 123/549 |
| 7,464,699 B2 * | 12/2008 | Joppig et al. | 123/556 |
| 7,669,585 B2 * | 3/2010 | Haag et al. | 123/456 |
| 7,798,131 B2 * | 9/2010 | Hornby | 123/491 |
| 7,942,136 B2 * | 5/2011 | Lepsch et al. | 123/549 |
| 2005/0257781 A1 * | 11/2005 | Linkenhoger | 123/549 |
| 2007/0056570 A1 * | 3/2007 | Elia et al. | 123/549 |
| 2009/0107473 A1 * | 4/2009 | Imoehl et al. | 123/549 |

* cited by examiner

COLD START UP AUXILIARY SYSTEM FOR ALCOHOL AND FLEX ENGINES WITH AIR-INLET AND ALCOHOL WARM UP

TECHNICAL FIELD OF THE INVENTION

The present invention refers to a cold start auxiliary system, of the type to be used preferentially in engines with internal combustion engines that use alcohol as fuel, which are included in the possibility of the use of this invention in "Flex Fuel." (alcohol/gasoline/GNV) engines.

PRIOR ART DISCLOSURE

The systems denominated "auxiliary cold start up", generally known by the technique, include a gasoline reservoir with an electropump injection, which, through an electrovalve and of a "one way" (unidirectional) valve, provides the injection of a certain amount of gasoline inside of the intake manifold or in the close area to the intake valve of the cylinder, in the moment of the engine start up and during the accelerations in the engine warm up period.

The amount of gasoline and the feeding time are commanded by the electronic unit that acts directly on the electropump injection, through a relay, as well as on the electrovalve.

However, and in spite of the extensive application of these systems in alcohol vehicles, which are not free from inconveniences.

Specifically, the amount of gasoline injected gasoline is critical on several points of view, and among them one can point out its direct influence together with the emission of pollutants by the vehicle. On the other hand, the injection of an insufficient amount of gasoline does not allow the start up of the engine, damaging and reducing the useful life of the starter engine and providing an evident dissatisfaction of the user.

It also is related to the control of the amount of injected gasoline the driveability during the warm up period of the engine, the strong influence in the levels of pollutant emissions and in the fuel consumption.

Another negative factor of the cold start up systems that use the gasoline is the clogging of the inlet pipe and of the calibrated hole through where the gasoline is injected. This occurs mainly due to the gasoline aging that remains for a long time inside of the reservoir without being used, therefore the gasoline oxidizes, loses properties and it incurs on the gum formation. This happens because the start up of this system only occurs on colder days of winter, where, for the operation of the cold engine, the presence of the gasoline is necessary. Examples of this technology are the Brazilian requests PI 8801648-0 and PI 9002905-4

Moreover, the distance between the inserting of gasoline point, located in the intake manifold, and the intake valves cause an undesirable accumulation of gasoline on the walls of the intake manifold, causing losses to the cold start up system. Such problem is even more serious when dealing with engines with intake manifold of long branches. In order to solve this problem, a Brazilian request PI 0300761-8 was recently proposed, which consists of an injection auxiliary system, endowed with auxiliary outlet of fuel injection for cold start up, and the injection being made closer to its burning point.

For the start up optimization, driveability during the engine warm up and consequent decrease of the pollutant emission levels, a cold start up system was developed for cold alcohol engines that use an injection nozzle (5$^{th}$ nozzle) to introduce the gasoline in the intake manifold. For intake manifolds of long branches, the system uses two injector nozzles (one for each two cylinders) positioned close to the intake valve and close the entrance of the cylinder, according to the patent requests PI 9905212-1 (5° nozzle) and C1 99052121 (with two additional nozzles) of this same depositor.

The inserting of gasoline in the intake manifold through injector nozzles allows a better control on the amount and form of gasoline injection, in the moment of the cold start up and during the warm up period of the engine. This gasoline control in an optimized way is not possible with the conventional system, in other words, the inserting of gasoline in the intake manifold through a pipe with calibrated hole.

The system described in the PI 0300761-8 process refers to the inserting of auxiliary fuel (gasoline or vapors coming from the fuel tank) for cold start up through an adjacent channel to the fuel injector nozzle, this way the auxiliary fuel can be added close to the intake valve and together with the main fuel. This request presents a great similarity with the objective of the system described in the C1 99052121 process, where the two additional injectors close to the intake valves pulverize the gasoline to aid the start up and cold operation of the alcohol engine.

In order to substitute the auxiliary gasoline injection, several systems were proposed, and these contemplate the alcohol warm up and consequently the elimination of the gasoline and of every necessary apparatus for the constitution of an auxiliary system of cold start up, which can present flaws and provide problems for the operation of the engine.

In the system described in the patent request MU-7502050-5, the necessary time for the complete alcohol warm up can be very long due to the need to warm up before the oil that involves a coil to obtain of a desirable temperature of the alcohol contained in the coil.

US 2007/0056570 (ELIA et al., 2004) describes a system where the alcohol is warmed up inside the nozzles injectors, the amount of fuel warmed up can be insufficient for the cold accelerations, because the largest flow of necessary fuel in this operation at low temperatures cannot be promptly warmed up inside the small volume that is inside the nozzle injector.

In the system where the warmed up alcohol is inserted in the intake manifold, a loss of heat can occur inside the ducts and the fuel can get to an insufficient temperature in the combustion chamber. In order to reduce this Possibility, U.S. Pat. No. 5,894,832 to Nogi et al teaches the fuel heating inside the fuel injector. The fuel injector is connected to a tubular idle air mixer chamber surrounded by electrical heaters through which a partial quantity of intake air is taken during the engine idle. Downstream this structure, the warmed up air/fuel mixture is addressed to engine cylinders through ducts. However, this system is just directed to idle engine operation (throttle valve closed), that means, it is limited and focused to cold start up and to engine warming up in idle engine operation. To higher intake air conditions (higher rotational speed—RPM), Nogi's proposed system is not able to fulfill the proper and sufficient heating of air/fuel mixture once the air intake flux through intake duct is much higher than the allowable air flux by Nogi's heating system. When driver needs to Quickly move the vehicle after its cold start up, Nogi's system will not work properly and engine will collapse (turn off). Reminding that the flashpoint (temperature from which there can be enough amount of fuel vapor for the combustion) of the alcohol is 13° C. and its combustion below this temperature is difficult, in situations of engine operation under very low temperatures such systems can become ineffective, because besides the loss of heat, a considerable amount of alcohol can remain deposited on the ducts walls (condensation).

This way a new cold start up system for alcohol engines or with the possibility to use in multi-fuel engines (flex engines) constitutes the object of the present invention, which allows the elimination of all necessary apparatus for the gasoline injection, as aid in the start ups and the cold accelerations.

This new system substitutes the conventional system of inserting of gasoline during the cold start up and engine warm up period, by an air warm up and/or alcohol system. Depending on the environment temperature the air intake and the alcohol warm up can be made separately. Otherwise, it is possible the air/fuel mixture temperature and warm up to be effectively reached and kept even in higher rotational speed operational condition, other than in idle operational condition. According to present invention, this operational characteristic is reached due to the combination of electrical heaters and working method, as described below.

The air intake warm up is made by electric resistances positioned strategically on the parts that compose the intake system, in other words, in the suction pipe and/or air filter and/or body of the throttle and/or collector conduits and/or headstock conduits or in each one of these parts separately, or combining these possibilities.

The warmed up air can also be supplied by an electric powered turbine, which has electric resistances systems for the air warm up and the circulation forced into the intake manifold.

Considering only the main injectors (one for each cylinder), the alcohol warm up can be made by resistances positioned in the entrance of each injector and/or inside each injector and/or by a resistance for every nozzle holder pipe. For the alcohol warm up one can combine these three positions of the resistances or in each of these points separately.

Another form for the alcohol warm up is the use of one or two additional injector nozzles (supplementary) for the inserting of warmed up alcohol in the intake manifold. In this condition, the alcohol warm up may or may not exist in the main injectors or in the main holder of nozzles. In such case, the alcohol warm up through the use of the supplementary injectors can be made in a similar way, in other words, for resistances positioned in the entrance of each supplementary injector and/or inside of each supplementary injector and/or by a resistance for every supplementary pipe holder of nozzles. For the alcohol warm up in this condition one can combine these three positions of the resistances or in each one of these points separately.

This system with alcohol warmed up supplementary injectors is interconnected to the main system, in other words, the work pressure is the same for all injectors. As the inserting of warmed up alcohol in the intake manifold is made through injectors, the same condensation possibility or deposit on the walls is minimized, therefore the alcohol mass contained in the "spray" is almost driven in its totality inside the cylinders.

This concept of use of supplementary injectors is the same one that this applicant described in the patent requests PI 9905212-1 ($5^{th}$ nozzle) and C1 99052121 (with two additional nozzles). The great advantage of the use of the supplementary injectors is that the warm alcohol output can be controlled and adjusted (via ECU) as in the main injectors.

BRIEF DESCRIPTION OF THE DRAWINGS

The present invention will be understood better in the light of the figures enclosed, presented as mere figure, but not limiting the scope of the invention, where some of the air inlet and alcohol warm up for the present invention are shown.

DETAILED DESCRIPTION OF THE INVENTION

Figure 1:
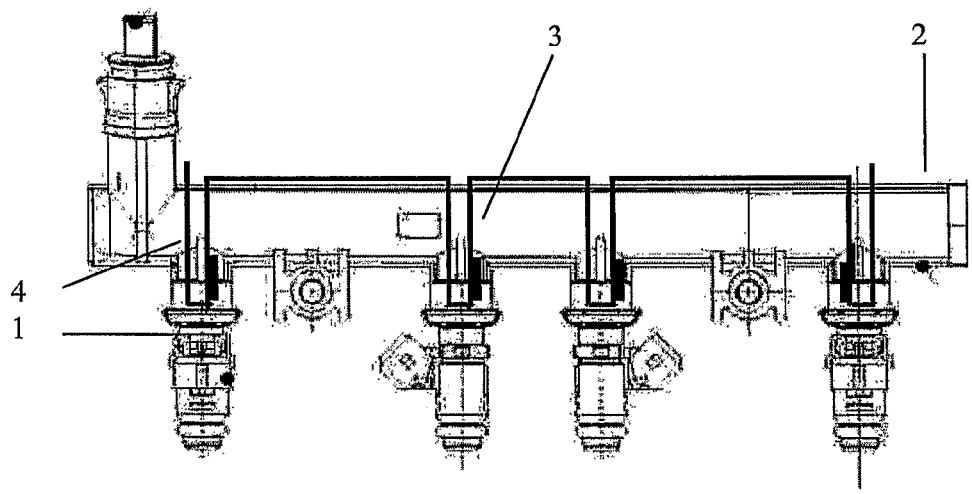
FIG. 1 shows the electric resistances positioned in the entrance of the injectors.

Alcohol Warm Up a) Warm Up in the Main System (Direct)

The warm up of the fuel is the fastest way to guarantee to guarantee that it gets to temperatures above the flashpoint. This warm up is made in a way that the alcohol gets to a temperature estimated at 30° C., because below the flashpoint of the alcohol at 13° C., the alcohol combustion occurs in a difficult way, once below this threshold, there is not enough amount of alcohol evaporated for an appropriate air/fuel for a good combustion.

Figure 2:
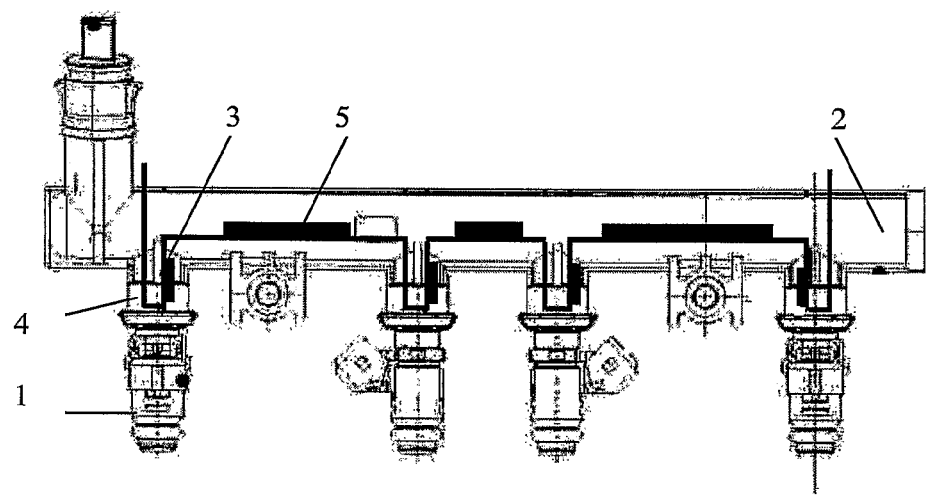
FIG. 2 shows the warm up combination of the pipe holder of nozzles and entrance of the injectors.
Figure 3:
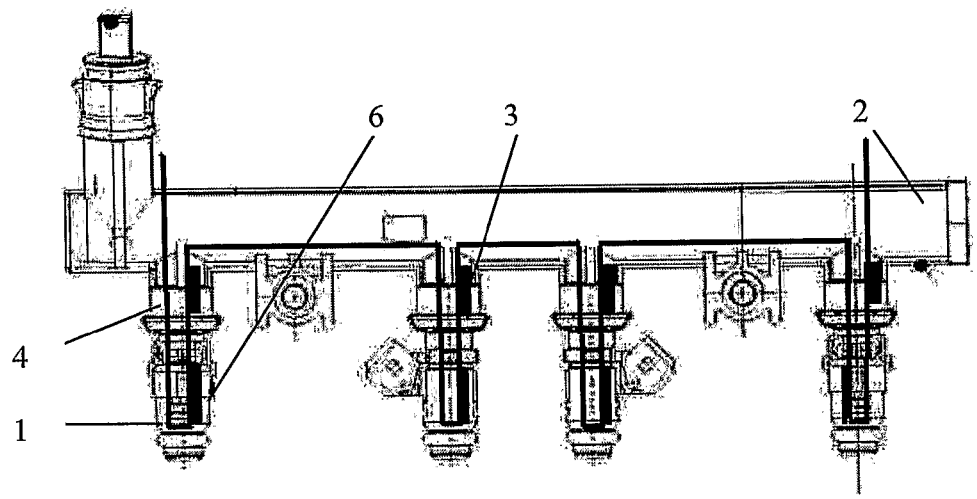
FIG. 3 shows the combination of two possibilities of alcohol warm, in the entrance of the injectors for electric resistances and inside each injector.
Figure 4:
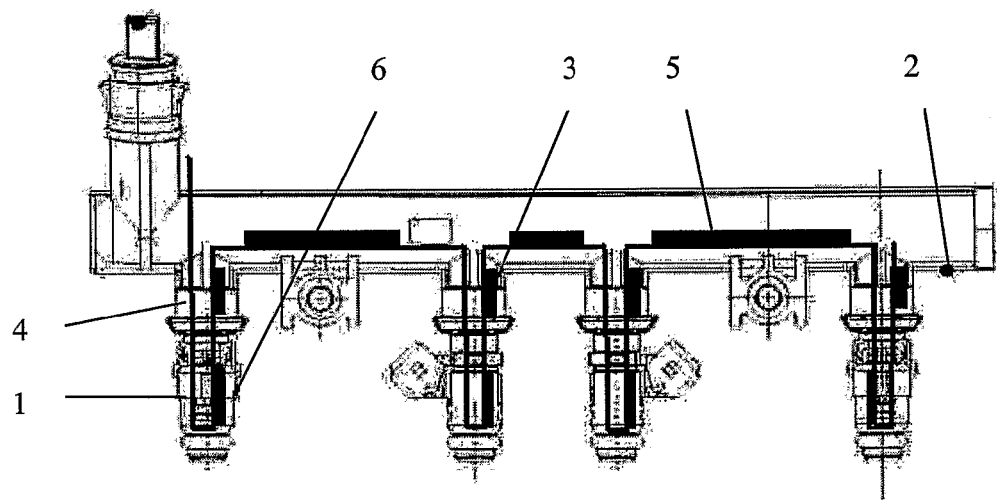
FIG. 4 shows the combination of the three possibilities of alcohol warm up, in other words, the alcohol is warmed up inside the distribution pipe or holder of nozzles for electric resistances along every internal part of the distribution pipe, in the entrance of the injectors for electric resistances and inside each injector.
Figure 5:
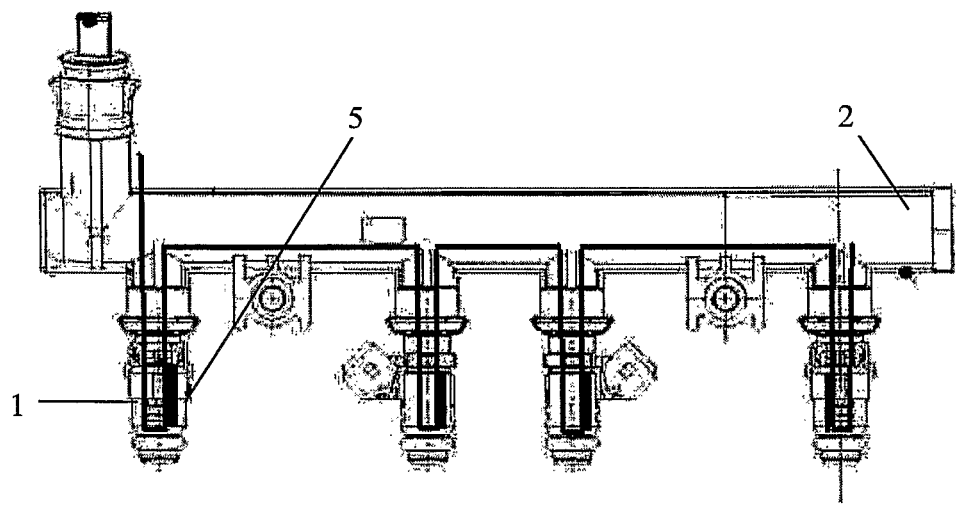
FIG. 5 shows the resistances only inside each injector.

The alcohol warm up can be made by resistances (3) positioned in the entrance of the injectors (4), by resistances (6) inside each injector (1) or by one resistance (5) for every pipe holder of nozzles (2), and these three possibilities can be used simultaneously, combined two by two or separately, depending on the need of the alcohol warm flow and of the energy consumption. The combination possibilities are shown as follows:

FIG. 1 shows electric resistances (3) positioned in the entrance of the injectors (4);

FIG. 2 shows the combination of electric resistances (5) in the pipe holder of nozzles (2) with electric resistances (3) positioned in the entrance of the injectors (4);

FIG. 3 shows the electric resistances combination (3) positioned in the entrance of the injectors (4); with electric resistances (6) positioned inside the injectors (1);

FIG. 4 shows the electric resistances combination (3) positioned in the entrance of the injectors (4); with electric resistances (6) positioned inside the injectors (1) and with electric resistances (5) in the pipe holder of nozzles (2);

FIG. 5 shows electric resistances (6) positioned inside the injectors (1); and

Figure 6:
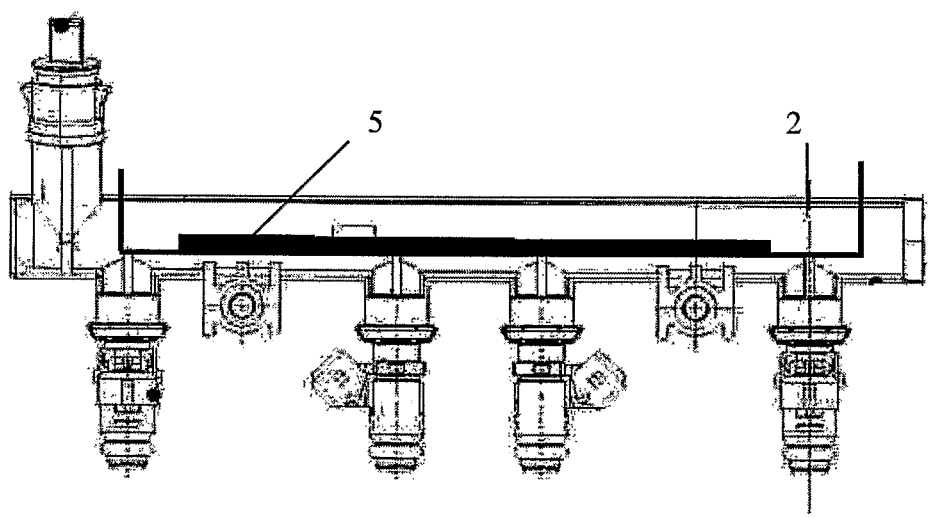
FIG. 6 shows a single electric resistance inside of the distribution pipe or holder nozzles.

FIG. 6 shows electric resistances (5) in the pipe holder of nozzle (2).

The alcohol warm up should guarantee that after the injection its temperature is superior to the flashpoint temperature. The temperature of 30° C. is a safety estimate, because below 13° C. (alcohol flashpoint) the alcohol combustion occurs in a difficult way since there is not enough amount of alcohol evaporated by an appropriate air/fuel mixture for a good combustion.

It is important to point out that the electric resistances (3), (positioned immediately before the injectors (1)) and in the nozzle holder pipe (2), also called the fuel gallery, are useful for the alcohol pre-warm up and to lessen the cold alcohol flow effect that gets to the injector (1) after the start up and first cold accelerations.

The alcohol warm up of the small volume inside the injectors (1) occurs in an almost instantaneous way, when there is no flow, in other words, with the alcohol inactive ready to be injected. However, this same volume is insufficient in accelerations after the cold start up, because the higher alcohol flow at low temperature (below or close to 0° C.) does not allow an appropriate warm up. In such case, it becomes necessary to the air warm up combination of the alcohol intake.

As shown in FIGS. 3, 4, the alcohol warm up will occur in a more efficient way, because it is pre-warmed up by the electric resistances (3) positioned in the entrance of the injectors (4) and with the electric resistances (5) in the pipe holder of nozzles (2). This way, the effect of the alcohol final temperature decrease in the cold accelerations, due to the injector outlet flow (1) will be minimized; therefore the pre-warm up allows a larger volume of warmed up alcohol before the passage through the injector (1).

The electric resistances that warm up the alcohol are activated and deactivated by ECU or Electronic Command Unit, due to the engine water temperature of the air contained in the intake manifold as explained further on.

b) Warm Up in the Supplementary System (Indirect)

The alcohol warm up through the use of the supplementary injectors can be made in a similar way related to the direct warm up (main system), in other words, for resistances positioned in the entrance of each supplementary injector and/or inside each supplementary injector and/or by a resistance for every supplementary nozzle holder pipe.

A first hypothesis and the use of two supplementary nozzles positioned in the intake manifold that pulverizes the alcohol at high pressure, forming a warmed up spray.

Figure 7:
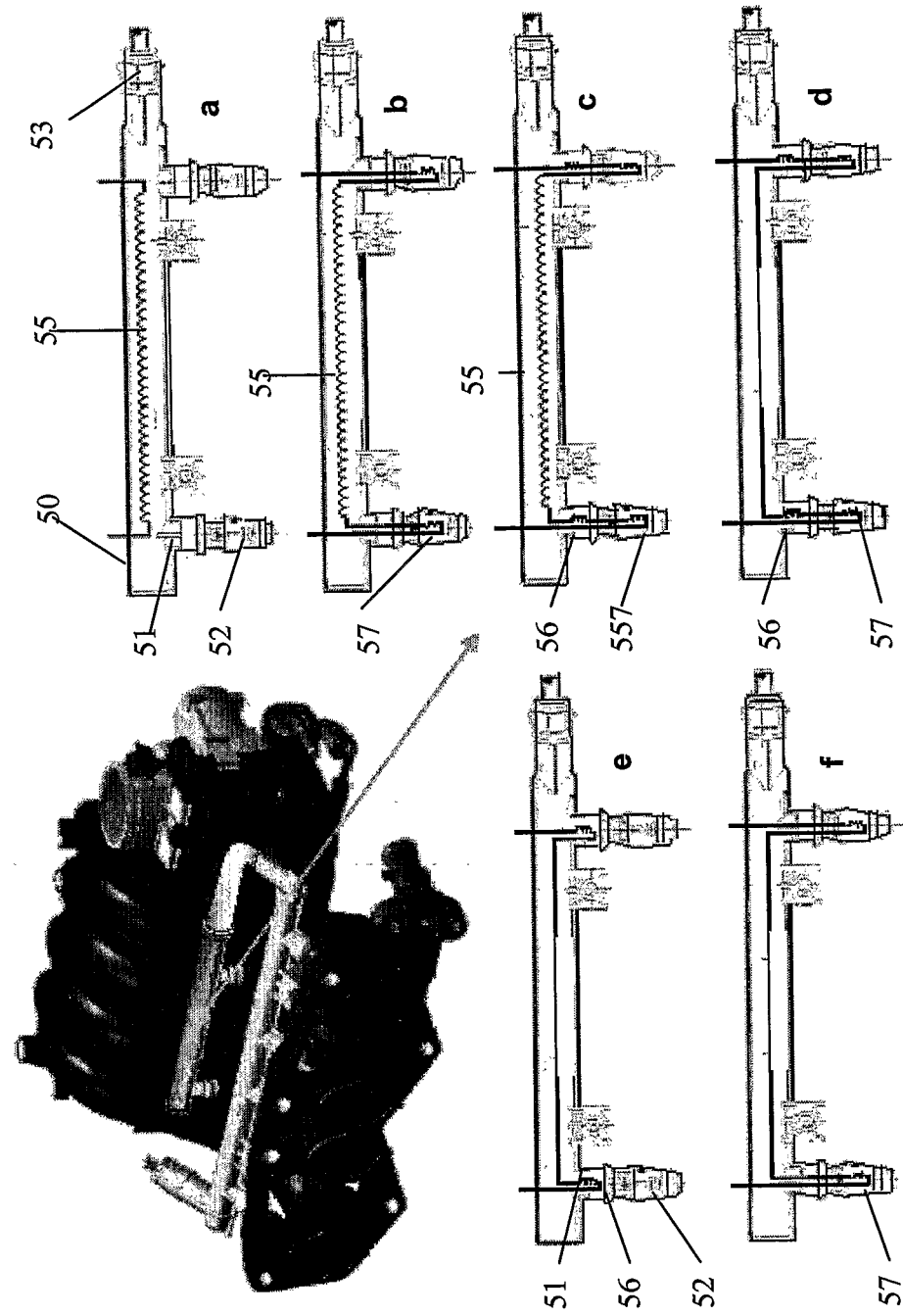
FIG. 7 shows a warm up supplementary alcohol system with two nozzles—injectors that warm up the fuel according to the positioning of electric resistances in the a) and f) hypotheses.

In this hypothesis the alcohol warm up can be made by resistances (56) positioned in the entrance of the injectors (51), by resistances (57) inside each injector (52) or by a resistance (55) for every pipe holder of nozzles (50), and these three possibilities can be used simultaneously, combined two by two or separately, depending on the need of the alcohol warmed up flow and the energy consumption. The combination possibilities are shown as follows:

FIG. 7a shows electric resistances (55) in the pipe holder of nozzles (50).

FIG. 7b shows electric resistances combination (55) in the pipe holder of nozzles (50) with electric resistances (57) positioned in the injectors (52);

FIG. 7c shows the electric resistances combination (55) in the pipe holder of nozzles (50) with electric resistances (56) positioned in the entrance of the injectors (51) and with electric resistances (57) positioned inside the injectors (52);

FIG. 7d shows electric resistances combination (56) positioned in the entrance of the injectors (51) with electric resistances (57) positioned inside the injectors (52);

FIG. 7e shows electric resistances (56) positioned in the entrance of the injectors (51); and FIG. 7f shows electric resistances (57) positioned inside the injectors (52).

Figure 8:
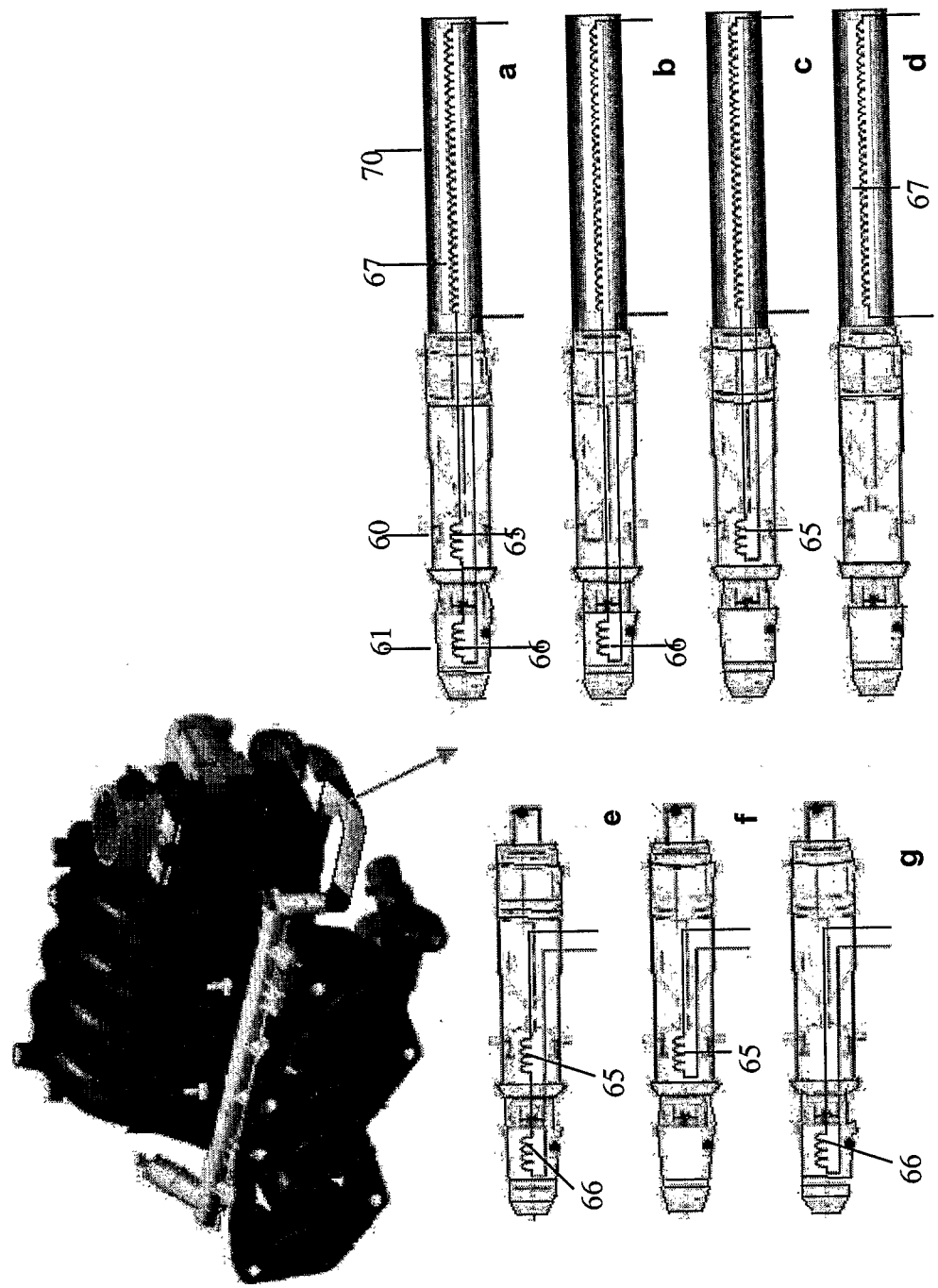
FIG. 8 shows a supplementary alcohol warm up system with a nozzle injector with electric resistances positioned in the intake manifold in a) and g) hypotheses.

A second hypothesis is the use of a supplementary nozzle positioned between the body of the throttle and the main pipe holder of nozzles, which pulverizes the alcohol and the high pressure, forming a warmed up spray. In this hypothesis the alcohol warm up can be made by resistances (65) positioned in the injector entrance (60), by resistances (66) inside the injector (61) or by one resistance (67) for every nozzle holder pipe (70), and these three possibilities can be used simultaneously, combined two by two or separately, depending on the need of alcohol warmed up flow and the energy consumption. The combination possibilities are shown as follows:

FIG. 8a shows the electric resistances combination (67) in the pipe holder of nozzles (70) with electric resistances (65) positioned in the entrance of the injector (60) and with electric resistances (66) positioned inside the injector (61);

FIG. 8b shows the combination of electric resistances (67) in the pipe holder of nozzles (70) with electric resistances (66) positioned inside the injector (61);

FIG. 8c shows the electric resistances combination (67) in the pipe holder o nozzles (70) with electric resistances (65) positioned in the entrance of the injector (60);

FIG. 8d shows electric resistances (67) in the pipe holder of nozzles (70);

FIG. 8e shows electric resistances combination (65) positioned in the entrance of the injector (60) with electric resistances (66) positioned inside the injector (61);

FIG. 8f shows electric resistances (65) positioned in the entrance of the injector (60); and FIG. 8g shows electric resistances (66) positioned inside the injector (61).

Air Warm Up

The air warm up in the draw in system is necessary to minimize the heat loss of the warmed up alcohol when the entrance in the cylinder that in its turn will have its walls cold. This situation is an aggravating circumstance when the environment temperatures are considered or below 0° C. In order to minimize the energy consumption for the engine warm up period, after the cold start up, the electric resistances are deactivated and the warmed up air used in function of the heat of the proximity of the exhaust manifold. After the complete engine warm up, the cold air is usually drawn in through another pipe.

The air warm up through electric resistances occurs in function of the heat by instant natural convection before the start up (inactive air inside the intake system) and forced convection after the starting of the start up engine (moving air for the cylinders). The resistances work as displays of the engine control system, in other words, the electric current passage through them occurs due to an electronic command originating from the electronic unit of the engine (ECU or Electronic Command Unit). This command is programmed to liberate the electric current due to the environment temperature through sensors positioned in the intake manifold and/or water temperature of the engine through water temperature sensors of the engine.

Figure 9:
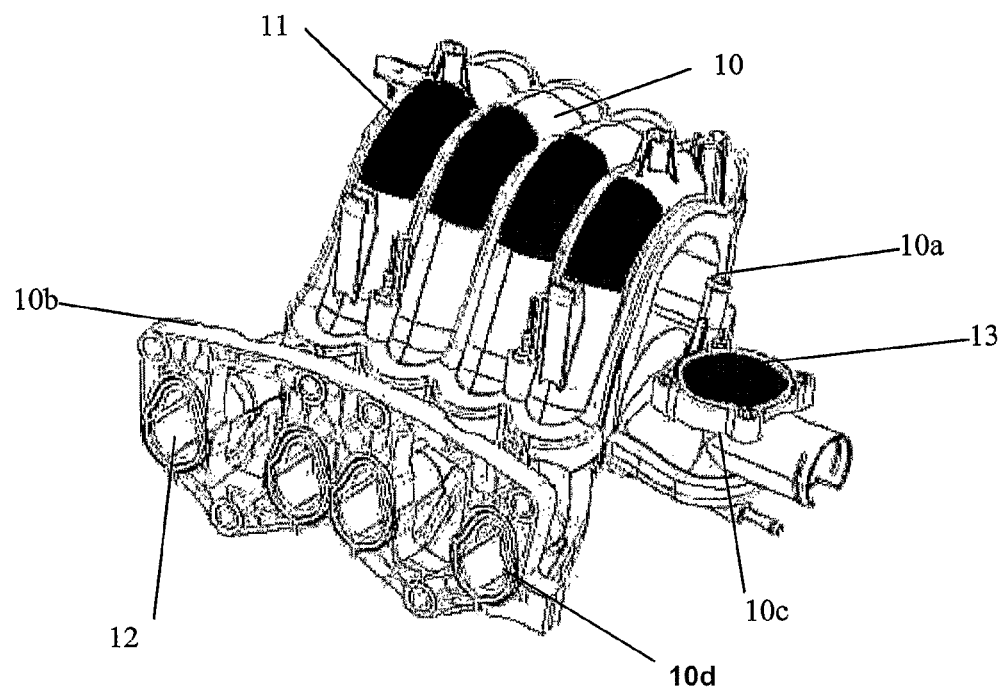
FIG. 9 shows the air warm up possibilities inside of the intake manifold in the body of the throttle.
Figure 10:
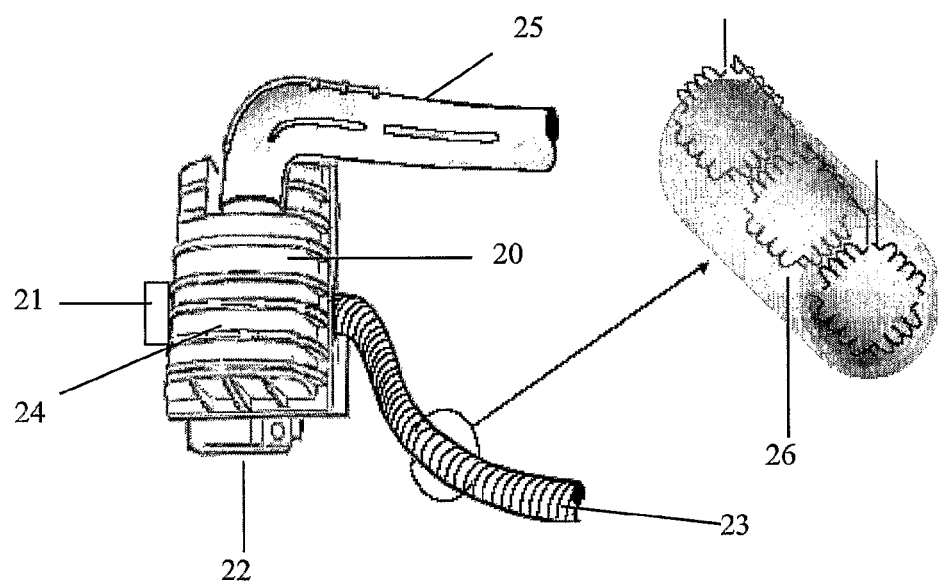
FIG. 10 shows schematically the position of the resistances in the air entrance secondary pipe close to the exhaust manifold.
Figure 11:
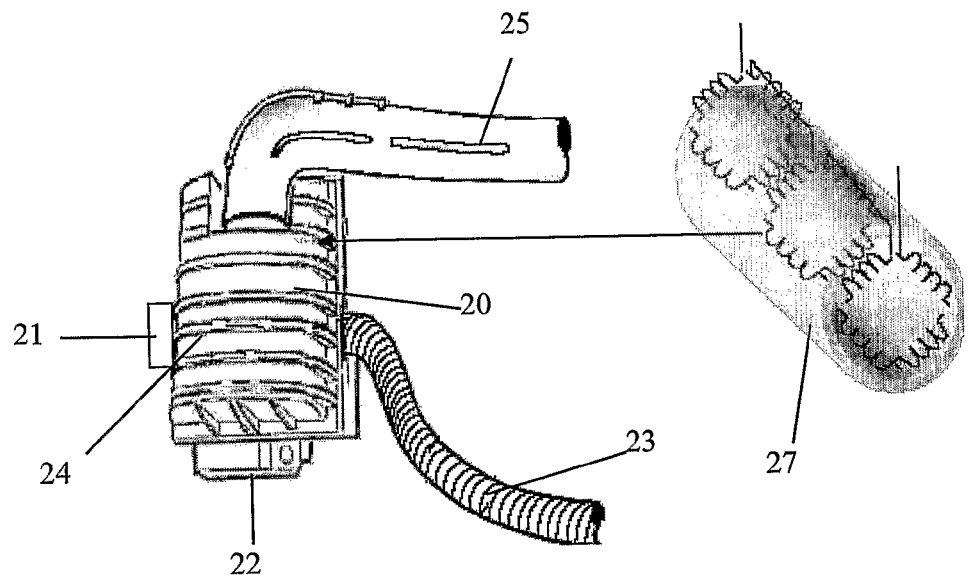
FIG. 11 shows the electric resistances inside the air filter or in the air sending pipe for the body of the throttle and secondary pipe.
Figure 12:
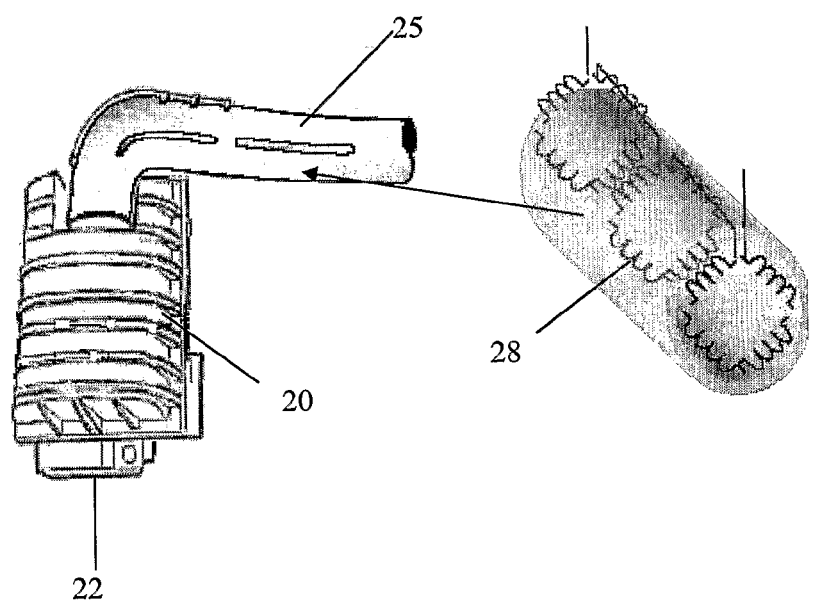
FIG. 12 shows the air warm up in the connection pipe of the filter to the intake manifold, without the presence of the secondary pipe.

FIGS. 9 to 12 show how the warm up air intake can be promoted through electric resistances or warm up of the metallic parts of the intake system that are in direct contact with the air intake. In the case of the electric resistances, these can be positioned strategically in the parts that compose the intake manifold (10), in other words, in the suction pipe and/or body of the throttle (10c) and/or collector conduits (10b) and/or suction in conduits of the headstock (not represented) or in each one of these parts separately. In a more detailed way as follows:

FIG. 9 shows the (11, 12, 13) resistances positioned in the superior part of the suction collector (10a) or intake, in the inferior part of the collector (10c) and in the body of the throttle (10c);

FIG. 10 shows schematically the position of the resistances (26) in the secondary pipe (23) of air intake close to the exhaust manifold not shown;

FIG. 11 shows the electric resistances (27) inside the air filter (20) or in the air sending pipe (25) for the body of the throttle (10c) and the secondary pipe (23); and FIG. 12 shows the air warm up inside the air filter (20) or in the air sending pipe (25) for the body of the throttle (10c).

The positions of the electric resistances can vary in function of the constructive need of the intake manifold and of the fluid-dynamic. For new collectors the electric resistances can be considered in the beginning of the project and be positioned strategically inside of the intake manifold itself (10), in the air filter (20) or in air sending pipe (25) for the body of the throttle (10c) in way not to harm the air flow and consequently the performance of the engine.

For intake manifolds that are in use and with the defined project, the best position of the electric resistances is that one inside a secondary pipe (23). This pipe (23) is useful as air intake only when the engine is cold.

For a better pipe warm up effect (23), this should have a volume the closest as possible of the air volume moved in a complete cycle of the engine. Considering as permanent regime, the air flow that enters and leaves the cylinders, the mass of cold air contained in the intake manifold in the first two turns of the crankshaft axle that make a complete cycle and are equal to the cylinder capacity of the engine, and will be substituted by the warmed up air volume in the secondary pipe (23). This way, in the engine cold start up there will be a warmed up air volume sufficient for the optimized combustion of the alcohol, also already previously warmed up.

In such case, while the engine is cold (as verified through the water temperature and/or temperature of the air inside the intake manifold), the air intake will occur by the secondary pipe (23), when at the instant start up until the engine warm up, will receive heat internally given by the electric resistances (26).

The intake circuit still has the air filter (20), a sending tube of filtered air for the intake manifold (25), the deflector (24) and the thermostatic valve (21). The air intake in the cold operation beginning and the first cold accelerations will be supplied in function of the proportionate warm up by the electric resistances (26) inside the secondary pipe (23).

The starting of the electric resistances is made through the Electronic Command Unit or ECU in function of the engine water temperature and the temperature inside the intake manifold. The indicative values are inferior temperatures to 30° C. The temperature of 30° C. is a safety estimate, because below 13° C. the alcohol combustion occurs in a difficult way, once below this temperature there may not be the quantity of sufficient alcohol evaporated for an appropriate air/fuel mixture for a good combustion.

The electric resistances (26) inside the secondary pipe (23) will be started before the starting of the start up key, together with alcohol warm up. This warm up beginning can occur, for instance, in the starting of the vehicle door handle, when the engine is cold ("cold start up intention"). The intake air warm up time by electric resistances (26) can be determined by the intake air temperature of the secondary pipe (23) close to the exhaust manifold, not shown, or by the engine water temperature, in other words, when there is available hot air due to heat change by convection in the proximities of the exhaust manifold (not shown).

The warmed up air passage is allowed by a deflector (24) commanded by the thermostatic valve (21) in function of the existent vacuum in the intake manifold. The present vacuum in the intake manifold causes the deflector (24) to allow only the passage of hot air coming from the secondary tube (23) at the start up time and cold accelerations of the engine.

When the intake air reaches a certain minimum temperature (ex. 30° C.) the deflector (24) begins to close the passage of warmed up air and begins the liberation of the passage of cold air, due to the action of the thermostatic valve (21) (bimetallic relay). When the temperature of the warmed up air reaches to a certain maximum temperature (ex. 50° C.) the warmed up air passage will be completely closed due to the action of the same thermostatic valve (21). The complete closing of the passage of hot air and consequently the liberation of the cold air separately indicates that the engine reached an ideal operational temperature.

This system provides the dosage of warmed up and cold air due to the position of the deflector (24). In such case, another form of deactivation (via ECU or Electronic Command Unit) the electric resistances (23) occurs due to an intermediate position of the deflector commanded by the thermostatic valve (21), because in this condition there will be availability of warmed up air originating from the proximities of the exhaust manifold (not shown) and the intake manifold itself, due to the heat generated by the engine.

An alternative to the system previously described is the use of a turbine (100) provided with an air warm up system that self circulates, in way to heat up and, at the same time, to fill out with better atmospheric performance to the intake manifold.

Before the engine cold start up (cold start up intention) the said turbine (100) with electric starting, provided from electric resistances system (101) for air warm up, it is started to promote the forced circulation of the warmed up air through the intake manifold (10).

This way, before the operation of the warmed up air engine, it circulates inside the intake manifold (10), in other words, it leaves the turbine (100), circulates the warmed up air inside the intake manifold (10) and this same air, already cooled due to of the course made, it enters again in the turbine (100). With this the intake manifold (10) it will be completely filled with air at an ideal temperature to mix with the alcohol before entering in the cylinders of the engine. The alcohol can be then injected by the main injectors (4) and or by the supplementary injectors (52).

In the turbine outlet (100) there are electric resistances systems to promote the warm up of the air. The electric turbine (100) is linked to the intake manifold (10) or to the air tube (25) that ties the air filter (20) to the body of the throttle (10). The warmed up air leaves the turbine (100) and enters in the intake manifold (10), circulating in every component and returning to the turbine.

Figure 14:
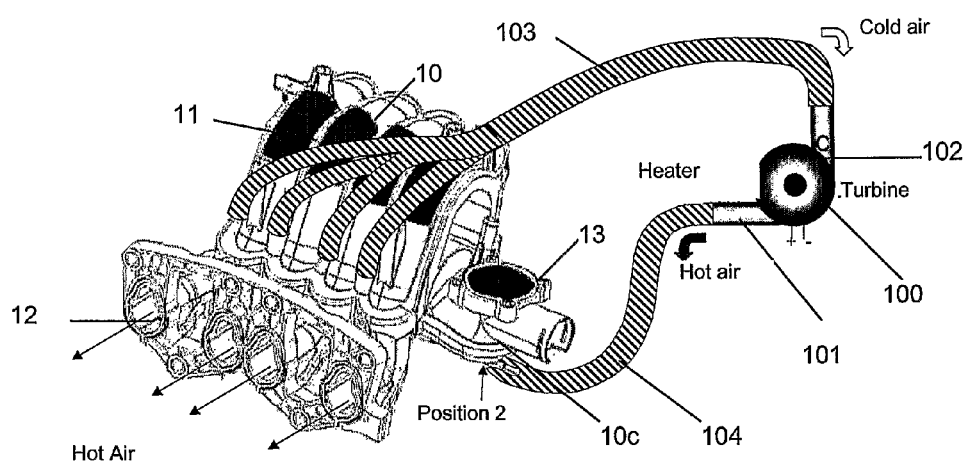
FIG. 14 shows the warmed up air being introduced below the throttle (position 2)
Figure 15:
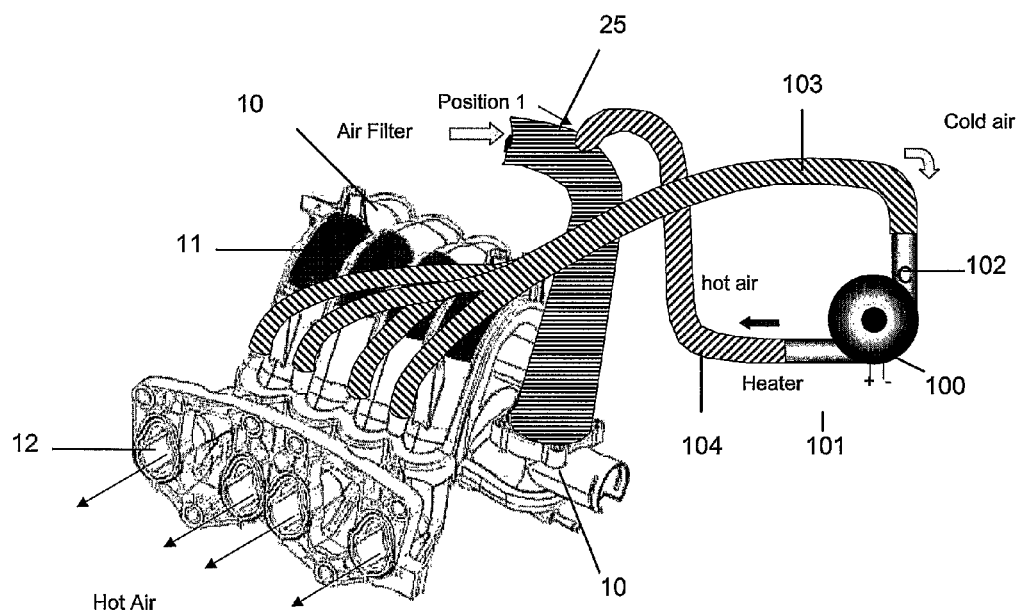
FIG. 15 shows the warmed up air being introduced in the tube that links the air filter to the body of the throttle (position 1)

The warmed up air can be introduced in the collector below the body of the throttle (10*c*) or in the air pipe (25) that ties the filter to the body of the throttle (10) as it can be observed in FIG. 14 that shows the warmed up air being introduced in the position below the body of the throttle (10*c*) and in FIG. 15 it shows the warmed up air being introduced in the pipe that links the air filter to the body of the throttle (25). In the configuration presented in FIG. 14, the throttle is closed during the process and the warmed up air fills in every volume of the collector (10) below the throttle to the entrance of the cylinders, where the openings are positioned (103) linked to the entrance of the turbine (100). In the configuration presented in FIG. 15 the warmed up air is introduced in the air tube (25) that links the air filter (20) to the body of the throttle (10). In this case, the throttle should be open (throttle with electronic starter), to allow the passage of the warmed up air flow inside the intake manifold. With the warmed up air being introduced this way, a larger volume of available warmed up air is obtained, once it is available during the start up, because the air will also occupy the part of the pipe that links the air filter to the body of the throttle and also the intake manifold.

After the starting the engine start up key, the turbine (100) and the electric resistances for air warm up continue working. However, the warmed up air does not return to the turbine, because it will be totally drawn in inside the cylinders, optimizing the alcohol combustion in low temperatures conditions once the warmed up air increases the alcohol evaporation range.

For the recirculation of the warmed up air (before the start up) and its use during the engine warmed up period (after the start up), the system uses valves commanded electrically. FIGS. 16 (the, b, c) and 17 (the, b, c) show schematically how the valves are respectively disposed with the warmed up air being introduced in the tube that links the air filter to the body of the throttle (25) and below the body of the throttle (10).

Figure 16A:
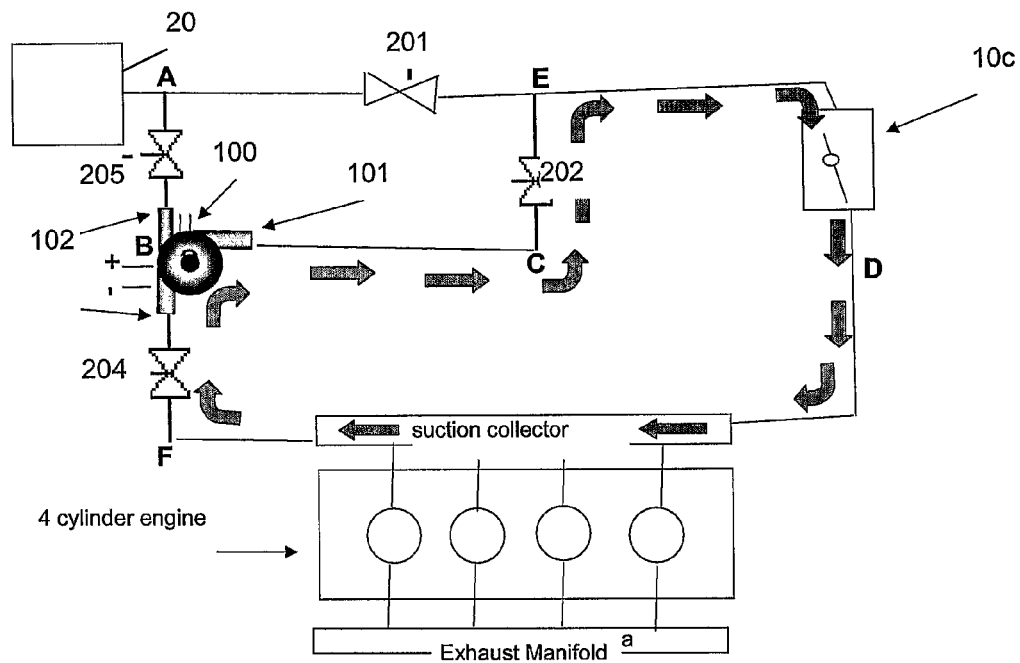
FIGS. 16a to 16c—show several configurations of the control valves along the warm up process of the air used in the combustion.
Figure 16B:
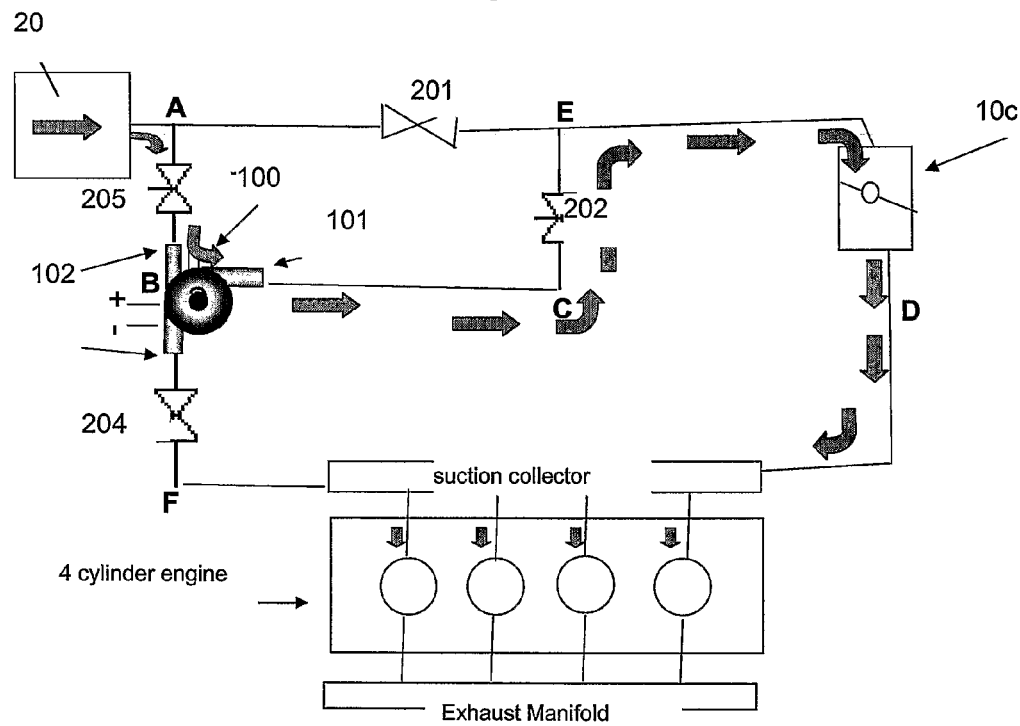

As an example we can see in FIG. 16*a* in the recirculation of the warmed up air before the start up (cold start up Intention) the flow is constituted by the B-C-AND-D-F-B itinerary, and valves (202, 204) opened and valves (201, 205) closed. This way the electric resistances and the turbine are activated and the warmed up air fills in the air tube, the body of the throttle (open electronic throttle) and the suction collector.

Thus, in the FIG. 16 *b*, the air circulation after the cold start up (cold operating engine), the flow is constituted by A-B-C-E-D-cylinders itinerary, and valves (205, 202) opened and valves (201, 204) closed. This way the cold air that goes through the air filter is warmed up in the turbine outlet.

Figure 16C:
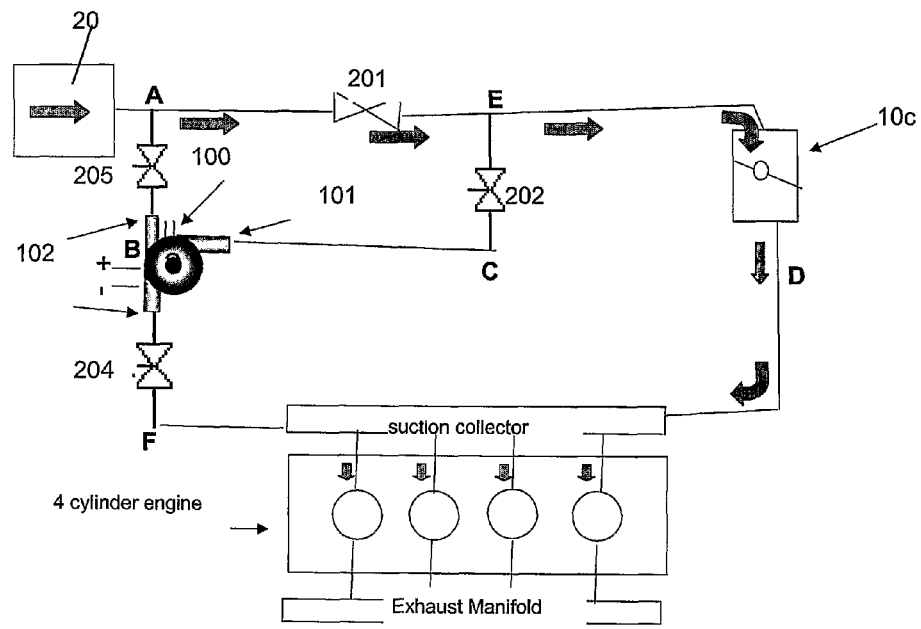

In FIG. 16*c*, the air flow after the engine warm up engine is constituted by A-E-D-cylinders itinerary, and valve (201) opened and valves (202, 204, 205) closed, with the air warm up circuit being deactivated.

Figure 17A:
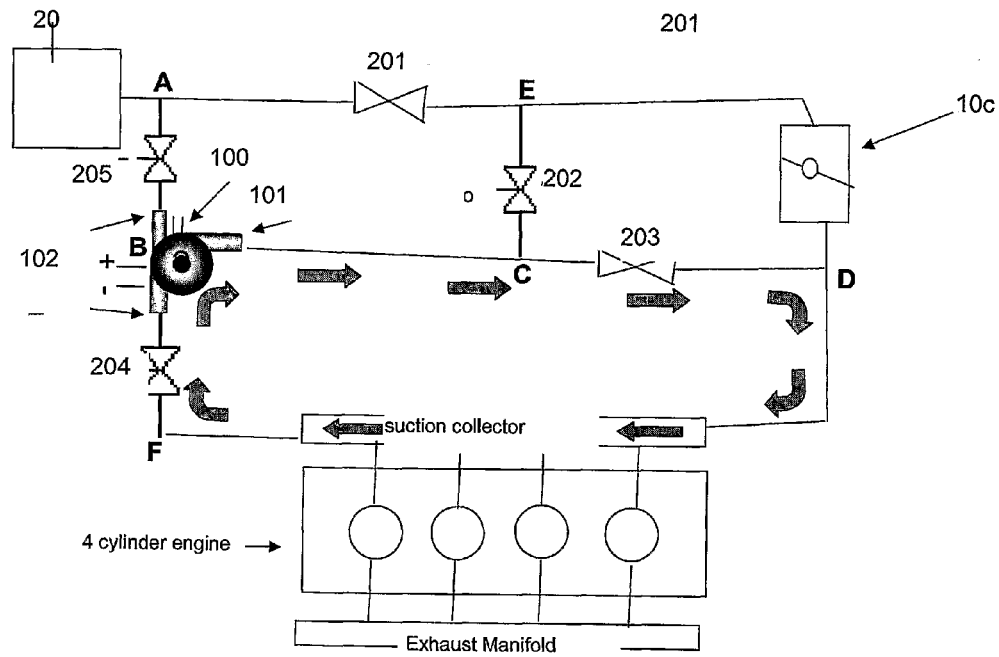
FIGS. 17a to 17c—show several configurations of the control valves along the air warm up process used in the combustion.

In another configuration we have in FIG. 17*a* the recirculation of the warmed up air before the start up (cold start up Intention) through B-C-D-F-B air flow, with valves (203, 204) opened and valves (201, 202, 205) closed. This way the electric resistances and the turbine are activated and the warmed up air fills the suction collector.

Figure 17B:
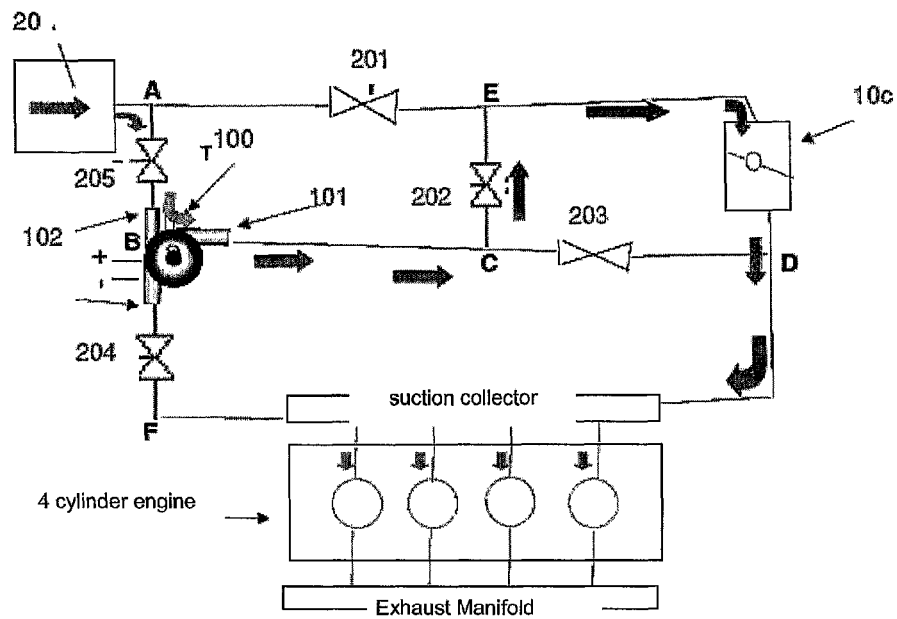

In FIG. 17*b* we have the air flow after the cold start up (cold operating engine), which is constituted by A-B-C-E-D-cylinders itinerary, with valves (205, 202) opened and valves (201, 203, 204) closed. The cold air that goes through the air filter is warmed up in the turbine outlet.

Figure 17C:
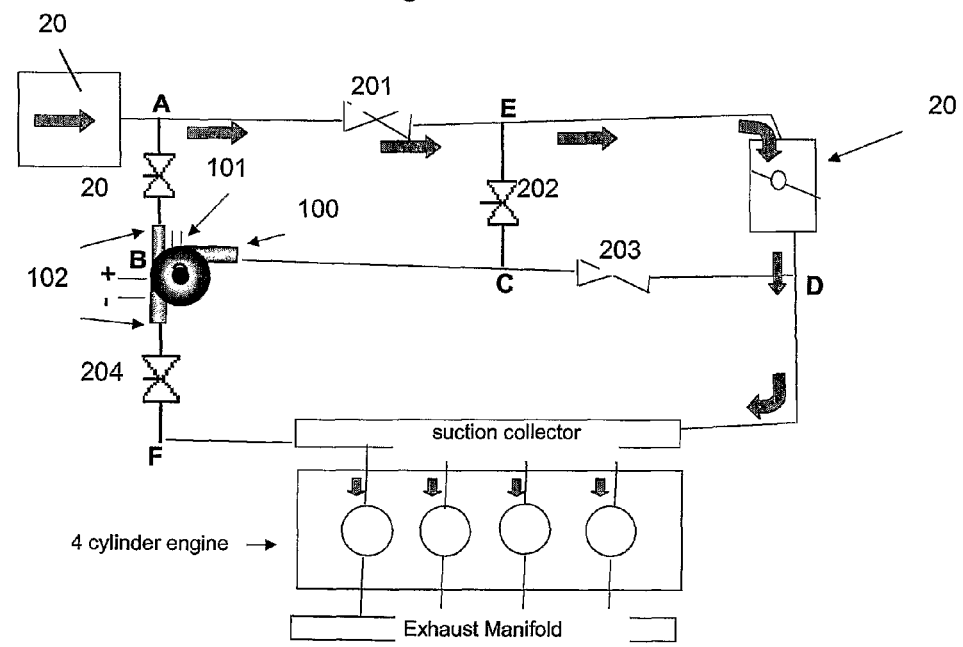

Finally, in FIG. 17*c* we have the air flow after the engine warm up that follows path A-E-D-cylinders with the valve (1) opened and valves (202, 203, 204, 205) closed. The air warm up circuit is deactivated.

Optionally the use of every warmed up air recirculation system can be suppressed before the engine start up. In this case, only the electric resistances are started before the engine start up (cold start up intention) and the electric turbine (100) is deactivated. At the time of the start up key starter, the electric resistances (101) remain activated and the electric turbine (100) is activated inside to insufflate the warmed up air inside the cylinders. This way, the warmed up air will be present in the cold start up and will also be used during the warm up period of the engine to improve the driveability and fuel consumption. FIG. 18 (*a, b*), shows schematically the configured system this way. If the body of the throttle has the throttle with electronic starter, this can be opened to increase the air flow inside the cylinders.

Figure 18A:
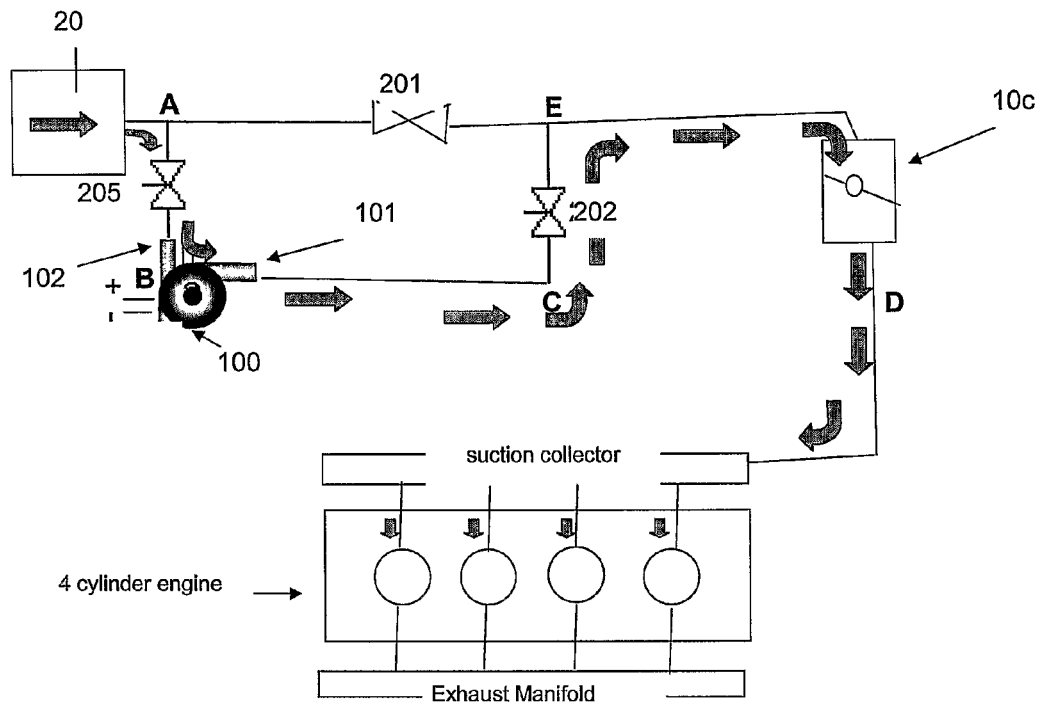
FIGS. 18a and 18b—show several configurations of the control valves along the air warm up process used in the combustion.

As an example we have in FIG. 18*a*, that in the air flow after the cold start up (engine operating) which is constituted by itinerary A-B-C-E-D-cylinders, and valves (205,202) opened and valve (201) closed. The electric resistances are started before the start up. The turbine is activated to insufflate warmed up air after the starting of the starting engine.

Figure 18B:
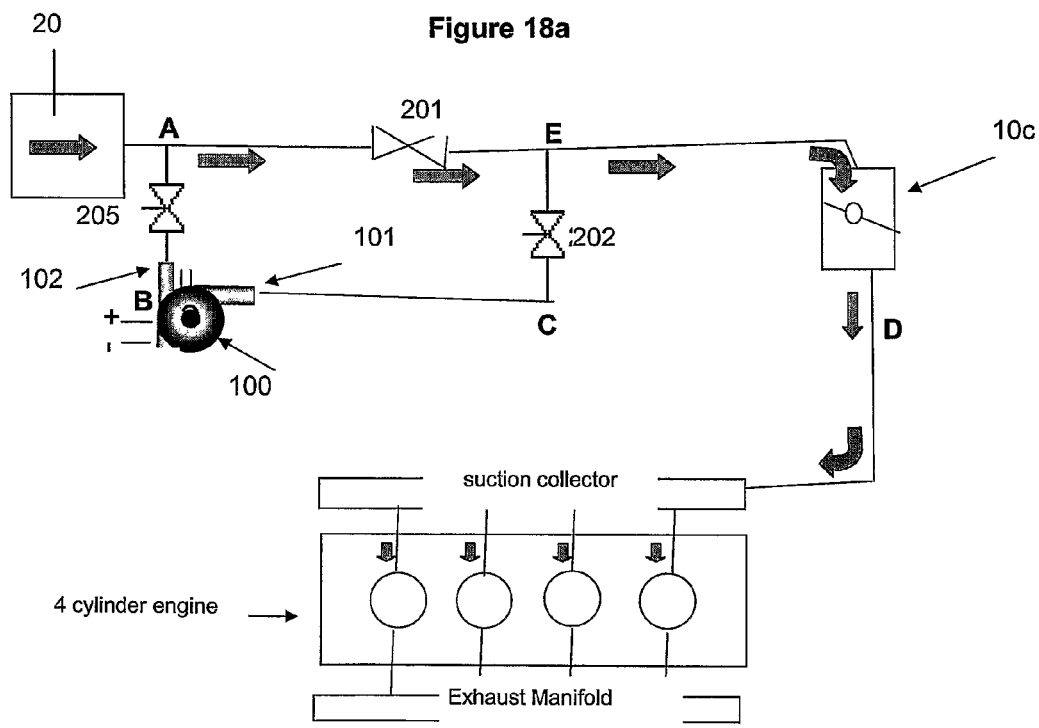

Thus, in FIG. 18*b*, we have the air flow after the engine warm up which is composed by itinerary A-E-D-cylinders with valve 1 opened and valves (202, 205) closed. In this moment the air warm up circuit is deactivated.

Another function of the cold start up auxiliary system with intake air and alcohol warm up can also improve the engine performance and reduce the fuel consumption. With this purpose, the system can also be used after the engine warm up phase.

The increase of the engine performance in this situation is related mainly to the torque and the power of the engine, when it is working in rotation range of lower rotation (former. 2000 to 4000 rpm).

Figure 19:
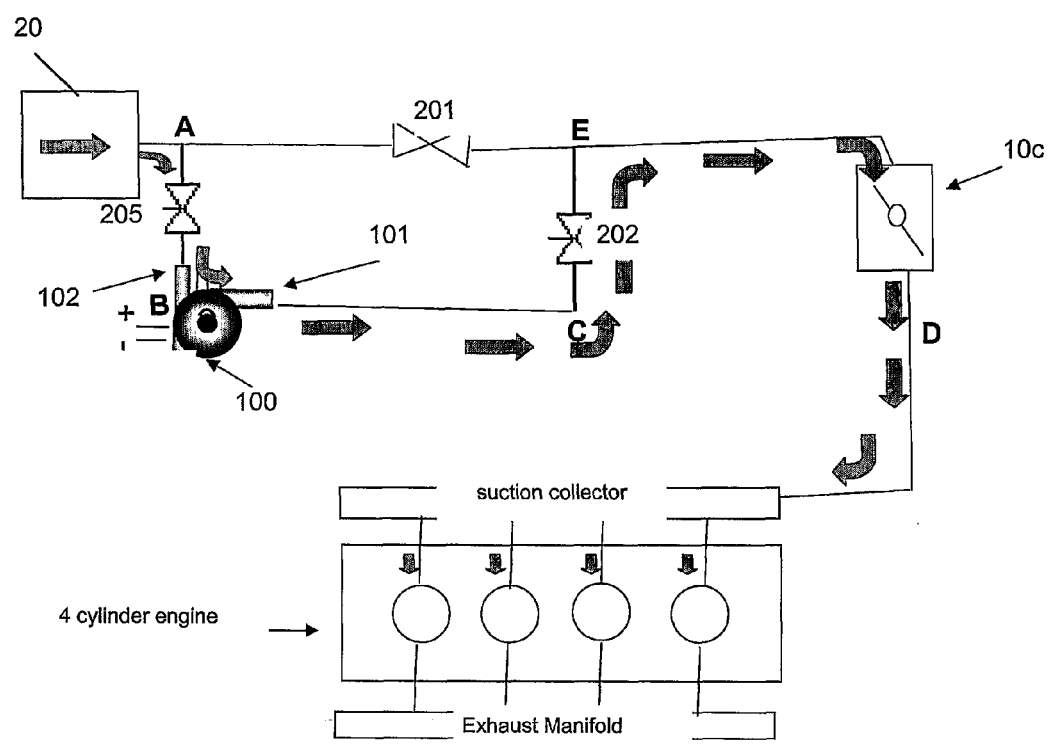
FIG. 19 shows the use of the turbine for the engine torque increase to low rotations.

Specifically in this case, the turbine (100) with electric starter installed to insufflate hot air in the engine's cold operational starter, can also be used (depending on the turbine's capacity) to increase the pressure in the suction collector and improve the engine's volumetric performance. When the engine is warmed up, the electric resistances (101) positioned in the turbine outlet should be deactivated, therefore the cold air provides higher volumetric performance. FIG. 19 shows schematically the way of the air through the engine's aspiration system. When the engine is working in rotations where there is a torque and power deficiency, the turbine is activated by the electronic unit, as well as the electrovalves. Besides the torque and power increase, it is also possible to improve the driveability in lower rotations.

In this case, as shown by FIG. 19, the cold air flow will be used for the torque and power increase (ex. 2000 to 4000 rpm). In this air flow, A-B-C-D-D-cylinders with valves (205, 202) opened and valve (201) closed. With the operation of the electric turbine an increase of the pressure in the intake manifold occurs, improving the engine's volumetric performance.

The electric resistances used to heat the alcohol in the start up and the engine's cold operation, can also be used to heat the fuel so that it vaporizes better, also after the engine's warm up phase, providing a decrease of the losses (fuel portion that does not participate in the combustion and is expelled by the exhaust). This way, less quantities of fuel can be used. In this case, independently of the type of fuel, the warm up can be used with the purpose of reducing the injected amount and consequently reduce the pollutant emissions through the exhaust. It is important to point out that the electric turbine when used in the low rotation regimes; can also enable fuel consumption and pollutant emission.

For a satisfactory beginning of the engine's cold operation, the warmed up alcohol originating from the first opening of the injectors should be mixed to the warmed up air. In order for this to occur the opening of the injectors must be delayed at least during the first turns (2 to 4 turns) of the crankshaft axle. This delay is equal to the necessary time so that all the cold air contained from the air filter to the entrance of the cylinders, is admitted inside the cylinders and expelled by the engine's exhaustion system, in other words, time from 1 to 2 complete cycles of the engine, avoiding this way, the presence of alcohol together with the cold air (which can result in the alcohol's final temperature below 13° C.) inside the cylinders, because its condensation on the electrodes of the plugs and walls of the cylinders can occur.

The alcohol condensation is extremely harmful in the beginning of the engine's operation (long times of cold start up and increase of pollutants emission). Strategically, during these first cycles of the engine, the start up plugs can be started to provide an initial warm up of the electrodes and the interior of the cylinders. Considering that initially the engine's rotation is provided by the engine's start up and, on average, it can be between 180 rpm and 300 rpm, the accomplished time of a complete cycle (two turns of the crankshaft axis) is between 0.6 s and 0.4 s.

Considering that on average the satisfactory cold start up time is around 1.0 s to 2.0 s, for environment temperatures of 20° C. and 0° C. respectively, in such case, the initial time without alcohol injection due to the "waiting" and the warmed up air, can maintain the start up time within the acceptable standards.

Another way of reducing the "waiting" time due to the warmed up air is to position the electric resistances (27, 28) inside the air filter itself or in the tube that links the filter to the suction collector. One must also consider the recirculation possibilities or forced circulation of the warmed up air through the electric turbine (100). The electric resistances inside the secondary pipe (23) are optional depending on the air intake circuit and its function continues being the one taking the warmed up air after the deactivation of the electric resistances.

Warm Up Control

The ideal intake temperatures and air and alcohol intake can be determined through a theoretical and experimental evaluation. Together with this alcohol warm up system, multiholes injectors can be used (holes 2, 3, 4, 6) to minimize the volatility effect and reduce the need of higher warm up temperatures.

The beginning of the admission air and alcohol warm up will always occur when the engine is cold, based on the intake air temperature and of the engine water before the start up. This can be made having as reference the cold start up intention, using, for instance, the starting of the vehicle's external door handle. In this case, if the start up is made, the warm up is maintained and, in otherwise, after a pre-determined time, the system is deactivated.

The system will also be deactivated after the appropriate ("warm-up") of the engine. This way, all cold accelerations will be made with the warmed-up air/fuel mixture. The air warm up deactivation through the electric resistances or metallic parts of the intake system can also be based on the engine's water temperature; because when the engine is in complete operation, even during warm-up, there is warmed-up air in the proximities of the exhaust manifold. This warmed-up air is useful as substitute of the electrically warmed-up air.

Figure 13A:
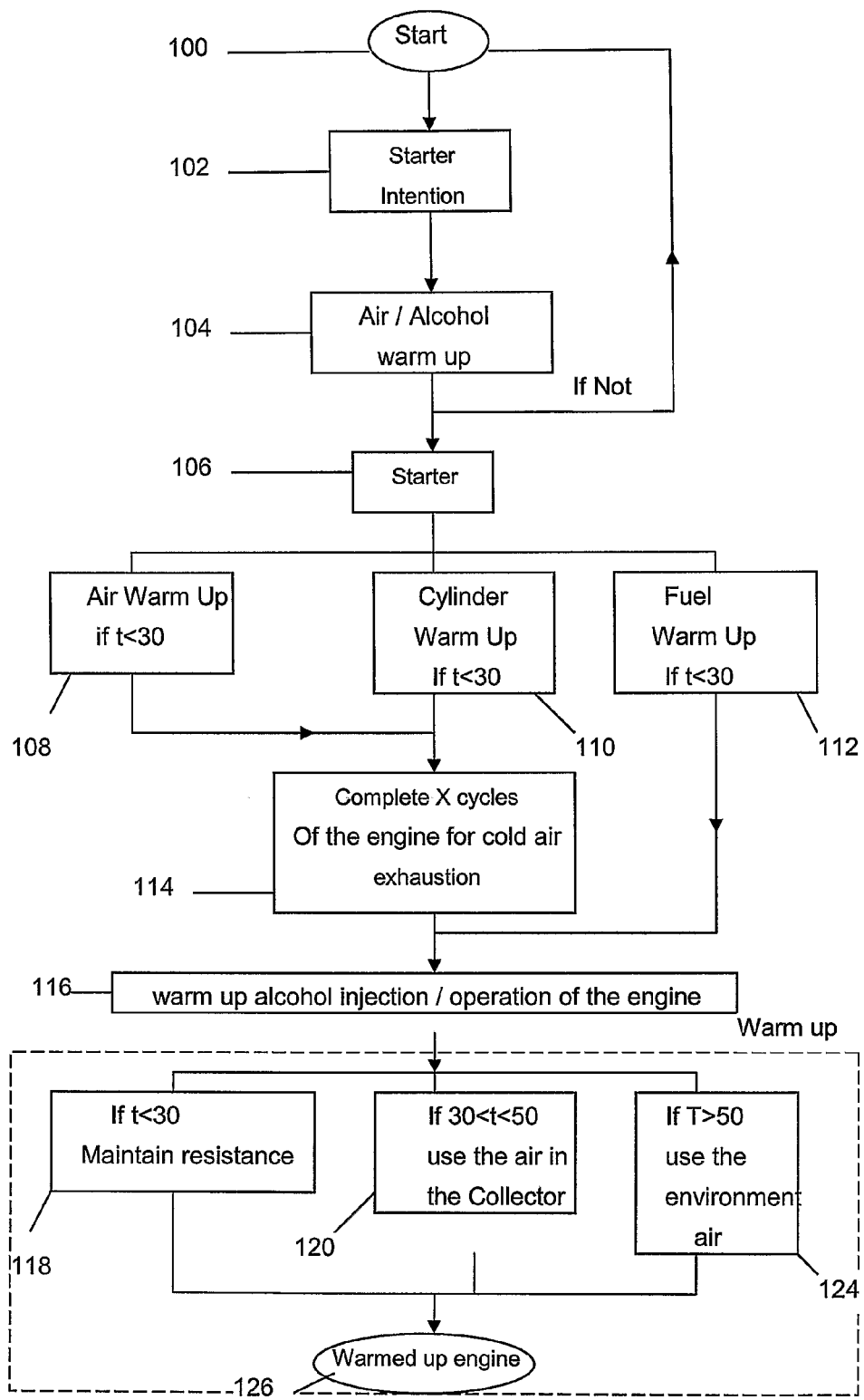
FIG. 13a shows the system flowchart of the cold start up of the auxiliary system.
Figure 13B:
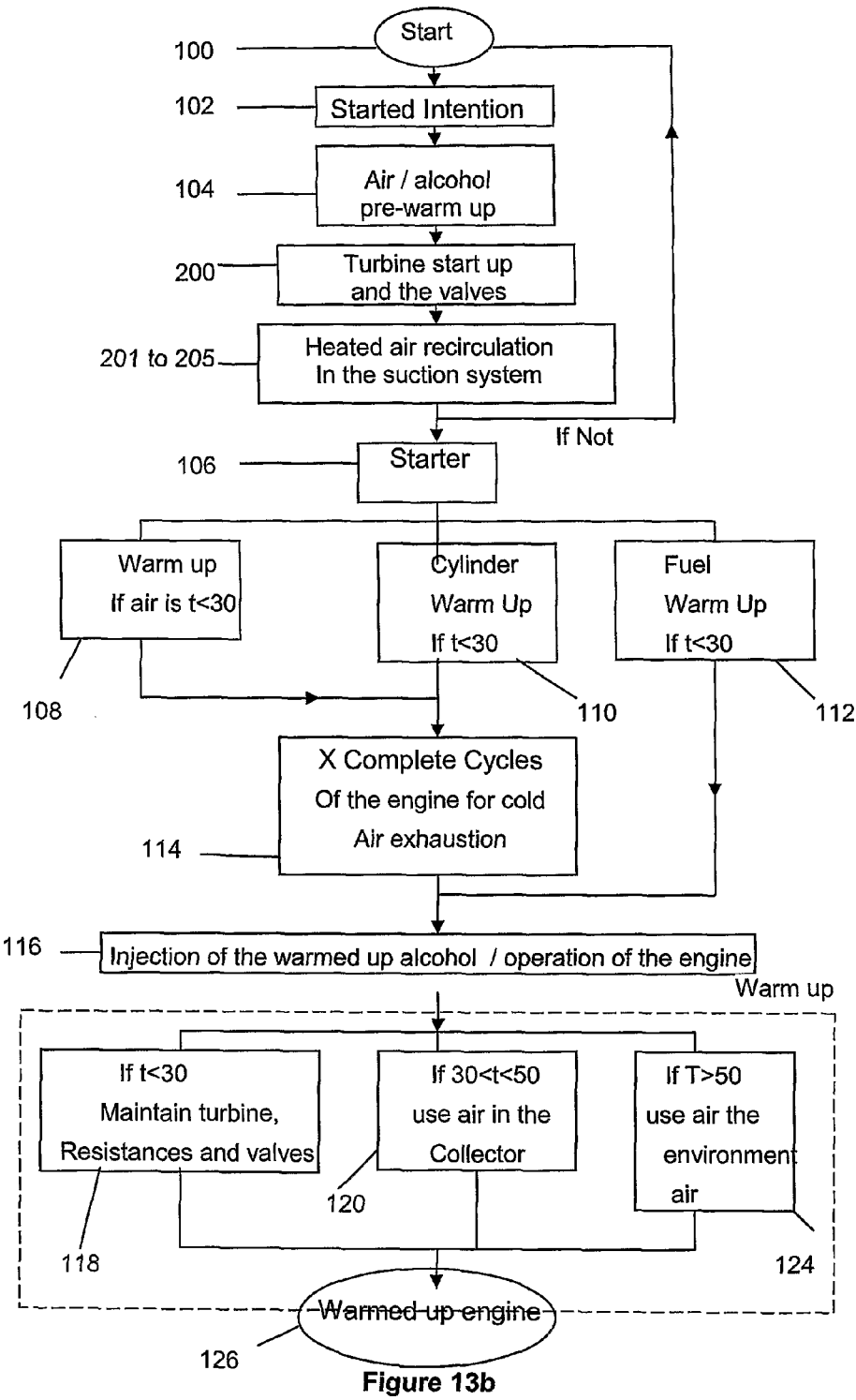
FIG. 13b shows the system flowchart of the cold start up auxiliary system using a turbine with electric warm up.

The system can be understood as a whole through the flowcharts of FIGS. 13a and 13b.

The outline presented in FIG. 13a can be summarized in the following stages:

alcohol and air warm-up (104) through resistances (3, 5, 6, 11, 12, 13, 26, 27, 28, 55, 56, 57, 65, 66 and 67) in the starting of the vehicle's door handle, when the engine is cold—cold start up intention—(102);

start up starter (106);

starting (110) of the start up plugs to provide an initial warm-up of the electrodes and the interior of the cylinders if the temperature is less than 30° C.;

maintenance (or continuation) of the air warm up (108) of admission by the electric resistances (26). Optionally the air warm-up can be made by the resistances present in the turbine (100);

starting of the starter engine for (2 to 4 turns) turns of the crankshaft axle (114) so that all the cold air contained in the air filter to the entrance of the cylinders is admitted inside the cylinders and is expelled by the engine's exhaustion system, in other words, time of 1 to 2 complete cycles of the engine;

maintenance (or continuation) of the fuel warm-up (112) with the inactive alcohol ready to be injected;

injection of the warmed-up alcohol (116);

In the case of the use of supplementary injectors, the main injectors (without the alcohol warm up) do not inject alcohol in the starter.

operation of the engine;

verification of the minimum air temperature:

in case it is less than a certain minimum temperature (ex. 30° C.) it maintains the warm-up (118) through the resistances (11, 12, 13, 26, 27, 28);

in case it is a temperature between a minimum value (ex. 30° C.) and an intermediate one (ex. 50° C.), it starts to close the warm-up air passage (120), and it begins the liberation of the cold air passage, due to the action of the thermostatic valve (21); in case it is higher than a certain maximum temperature (ex. 50° C.), the warmed-up air passage will be completely closed (124) due to the action of the thermostatic valve (21).

The outline presented in FIG. 13b can be summarized in the following stages:

alcohol and air warm up (104) through resistances (3, 5, 6, 11, 12, 13, 26, 27, 28, 55, 56, 57, 65, 66 and 67, 101) in the starting of the vehicle's door handle, when the engine is cold—cold start up intention—(102);

starting of the electric turbine (100);

starting of the valves (opened or closed—201, 202, 203, 204, 205) to allow the recirculation of the warmed-up air through the intake manifold (100);

start up starter (106);

End of the recirculation with the closing of the valves (205, 202, 204) and opening of the valve (201) to allow the sending of the warmed-up air to the cylinders through the body of the throttle (10);

starter (110) of the start up plugs to provide an initial warm-up of the electrodes and the interior of the cylinders if the temperature is less than 30° C.;

maintenance (or continuation) of the intake air warm-up (108) for the electric resistances (101).

start up of the starting engine per turns (2 to 4 turns) of the crankshaft axle (114) so that all the cold air contained in the air filter to the entrance of the cylinders is drawn inside the cylinders and is expelled by the engine's exhaustion system, in other words, time from 1 to 2 complete cycles of the engine;

maintenance (or continuation) of the warmed-up fuel (112) with the inactive alcohol ready to be injected;

warmed-up injection of the warm alcohol (116);

In the case of the use of supplementary injectors, the main injectors (without the alcohol warm-up) do not inject alcohol in the start up.

operation of the engine;

verification of the minimum air temperature:

in case it is smaller than a certain minimum temperature (ex. 30° C.) it maintains the warm-up (118) through the resistances (101);

in case it is a temperature between a minimum value (ex. 30° C.) and an intermediate value (ex. 50° C.), it begins to close the warmed-up passage (120) and it begins the liberation of the cold air passage, due to the action of the thermostatic valve (21);

in case it is higher than a certain maximum temperature (ex. 50° C.), the warmed-up passage will be completely closed (124) due to the action of the thermostatic valve (21).

deactivation of the system after the appropriate warm-up of the engine ("warm-up").

This way, during the cold start up or cold accelerations, the intake air and the alcohol portion to be used will always be warmed-up. The alcohol will be maintained in temperatures above the temperature that characterizes the flashpoint, in other words, 13° C., facilitating and optimizing its combustion.

In the case that the main injectors do not have alcohol warm up, the alcohol flow through them should be controlled (adjusted) in a way not to provide an alcohol cooling and the warmed-up air. In such case, while the engine is cold, the warmed up alcohol flow through the supplementary injectors, should be higher than the cold alcohol one (via main injectors).

Evidently, the great advantage is the complete elimination of all the apparatus used for the inserting of gasoline in the intake manifold. Besides, it represents a great advantage on these cold start ups systems with the alcohol warm-up exclusively, because in this case in very low environment temperatures, the warm-up alcohol loses heat until it gets inside the cylinders. For the suction collectors that have electric resistances in its internal part or with use of the electric turbine, the air warm-up will be very close to the entrance of the cylinders, and the "waiting" time being almost unnecessary by the warmed-up air. This way, it will not be necessary to retard the alcohol injection after the start up of the start up key.

The invention claimed is:

1. Fuel warm-up system to aid cold start up comprising:
    electrical heaters (3) positioned in an entrance of injectors (4);
    electrical heaters (6) inside each injector (1);
    an electrical heater (5) for all pipe holder of nozzles (2), and
    an electronic command unit for individually controlling activation and deactivation of each of the electrical heaters (3, 5, 6) such that the electrical heaters (3, 5, 6) can be used simultaneously, combined two by two or separately, depending on the need of alcohol warmed-up flow and energy consumption.

2. The fuel warm-up system to aid cold start-up of claim 1 further comprising:
    electrical heater groups (11, 12, 13) positioned in a superior part of a suction collector (10a) or intake, in an inferior part of the collector (10) and in a body of a throttle (10c); or
    electrical heater groups (26) in a secondary pipe (23) of the air intake proximate an exhaust manifold; or
    group of electrical heaters (27) inside an air filter (20) or in an air sending pipe (25) for the body of the throttle (10c) and the secondary pipe (23); or
    a group of electrical heaters (28) in the air sending tube (25) for the body of the throttle (10c),
    the electrical heaters being used in a united or isolated way, controlled by the electronic command unit and said air filter (20) having a thermostatic valve for a deflector control (24) of warmed-up air deviation by the secondary pipe (23).

3. Fuel warm-up system to aid cold start-up comprising:
    injection auxiliary nozzles installed in an intake manifold, said auxiliary nozzles having electrical heaters (56) positioned in entrances of the injectors (51);
    electrical heaters (57) inside each injector (52);
    an electrical heater (55) for all pipe holder of nozzles (50), and
    an electronic command unit for individually controlling activation and deactivation of each of the electrical heaters (55, 56, 57), such that the electrical heaters (55, 56, 57) can be used simultaneously, combined two by two or separately, depending on the need of alcohol warmed-up flow and the energy consumption.

4. The fuel warm-up system to aid cold start-up of claim 3 further comprising:
    electrical heater groups (11, 12, 13) positioned in a superior part of a suction collector (10a) or intake, in an inferior part of the collector (10) and in a body of a throttle (10c); or
    electrical heater groups (26) in a secondary pipe (23) of the air intake proximate an exhaust manifold; or
    group of electrical heaters (27) inside an air filter (20) or in an air sending pipe (25) for the body of the throttle (10c) and the secondary pipe (23); or
    a group of electrical heaters (28) in the air sending tube (25) for the body of the throttle (10c),
    the electrical heaters being used in a united or isolated way, controlled by the electronic command unit and said air filter (20) having a thermostatic valve for a deflector control (24) of warmed-up air deviation by the secondary pipe (23).

5. Fuel warm-up system to aid cold start-up comprising:
    an injection auxiliary nozzle installed in an outlet (10d) of an intake manifold, said auxiliary nozzles comprising:
    electrical heaters (65) positioned in an entrance of the injectors (60);
    electrical heaters (66) inside each injector (61)
    an electrical heater (67) for all pipe holder of nozzles (70), and
    an electronic command unit for individually controlling activation and deactivation of each of the electrical heaters (65, 66, 67), such that the electrical heaters (65, 66, 67) can be used simultaneously, combined two by two or separately, depending on the need of alcohol warmed-up flow and the energy consumption.

* * * * *

UNITED STATES PATENT AND TRADEMARK OFFICE
CERTIFICATE OF CORRECTION

PATENT NO.        : 8,646,437 B2
APPLICATION NO.   : 12/088075
DATED             : February 11, 2014
INVENTOR(S)       : Luis Carlos Monteiro Sales Page 1 of 1

It is certified that error appears in the above-identified patent and that said Letters Patent is hereby corrected as shown below:

On the title page, item (73) please correct the Assignee to read: "Fiat Automoveis S/A - Filial Mecânica", instead of: -- Fiat Automotives S/A - Filial Mecânica --.

Signed and Sealed this
Fifteenth Day of July, 2014

Michelle K. Lee
*Deputy Director of the United States Patent and Trademark Office*